United States Patent
Choi

(10) Patent No.: US 9,618,423 B2
(45) Date of Patent: Apr. 11, 2017

(54) SYSTEM AND METHOD FOR MISFIRE DIAGNOSIS OF VEHICLE ENGINE

(71) Applicant: HYUNDAI MOTOR COMPANY, Seoul (KR)

(72) Inventor: Kyeong Il Choi, Cheongju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 16 days.

(21) Appl. No.: 14/932,745

(22) Filed: Nov. 4, 2015

(65) Prior Publication Data

US 2016/0299035 A1 Oct. 13, 2016

(30) Foreign Application Priority Data

Apr. 8, 2015 (KR) .................. 10-2015-0049878

(51) Int. Cl.
*G01M 15/11* (2006.01)
*F02D 41/00* (2006.01)
*F02D 41/14* (2006.01)
*F02D 41/22* (2006.01)

(52) U.S. Cl.
CPC ......... *G01M 15/11* (2013.01); *F02D 41/0097* (2013.01); *F02D 41/1497* (2013.01); *F02D 41/22* (2013.01); *B60W 2550/147* (2013.01); *F02D 2200/1015* (2013.01); *F02D 2200/702* (2013.01)

(58) Field of Classification Search
CPC ............. G01M 15/11; F02D 2200/702; B60W 2550/147

USPC .......................................... 73/114.04, 114.12
See application file for complete search history.

(56) References Cited

U.S. PATENT DOCUMENTS

| | | | | |
|---|---|---|---|---|
| 5,311,773 A | * | 5/1994 | Bradshaw | B60G 17/019 73/114.04 |
| 5,505,087 A | * | 4/1996 | Angermaier | B60G 17/0165 73/114.04 |
| 5,507,180 A | * | 4/1996 | Tomisawa | G01M 15/11 73/114.04 |

(Continued)

FOREIGN PATENT DOCUMENTS

| JP | 05-231231 A | 9/1993 |
|---|---|---|
| JP | 05-332193 A | 12/1993 |

(Continued)

*Primary Examiner* — Erick Solis
(74) *Attorney, Agent, or Firm* — McDermott Will & Emery LLP

(57) ABSTRACT

A system for the misfire diagnosis includes an angular velocity sensor acquiring an angular velocity of an engine and an acceleration sensor acquiring an acceleration according to vertical vibration of a vehicle. A diagnosis unit is configured to compare the acceleration with an acceleration threshold to determine whether the vehicle is driven on a rough road and to diagnose whether misfire occurs. A threshold setting unit is configured to acquire misfire diagnosis results in a first test environment in which the vehicle is driven on the rough road without forcible misfire and in a second test environment in which the vehicle is driven on the rough road while the forcible misfire occurs. The threshold setting unit is further configured to calculate a misfire misdiagnosis rate and to update the acceleration threshold.

14 Claims, 3 Drawing Sheets

(56) References Cited

U.S. PATENT DOCUMENTS

| | | | | |
|---|---|---|---|---|
| 5,544,521 A * | 8/1996 | McCombie | ............ | G01M 15/11 701/110 |
| 6,799,453 B2 * | 10/2004 | Miyauchi | ............ | F02D 41/1498 73/114.02 |
| 7,607,345 B2 * | 10/2009 | Katayama | .............. | G01M 15/11 123/406.14 |
| 8,060,275 B2 * | 11/2011 | Asgari | .............. | B60W 50/0205 123/406.12 |

FOREIGN PATENT DOCUMENTS

| | | |
|---|---|---|
| JP | 07-034959 A | 2/1995 |
| JP | 2014-084840 A | 5/2014 |
| KR | 10-2012-0053224 A | 5/2012 |

* cited by examiner

SYSTEM AND METHOD FOR MISFIRE DIAGNOSIS OF VEHICLE ENGINE

CROSS-REFERENCE TO RELATED APPLICATION

This application claims the benefit of priority to Korean Patent Application No. 10-2015-0049878 filed in the Korean Intellectual Property Office on Apr. 8, 2015, the entire content of which is incorporated herein by reference.

TECHNICAL FIELD

The present disclosure relates to a system and a method for misfire diagnosis, and more particularly, to a system and a method for misfire diagnosis of an engine.

BACKGROUND

Incomplete combustion of an engine, that is, misfire in which abnormal combustion occurs in a cylinder of the engine, means that fuel injected into the cylinder cannot be completely combusted within a set period of time and is discharged to an exhaust system. When the misfire occurs, while the fuel, which is not completely combusted, is discharged to the exhaust system, serious problems including damage to a catalyst device or an engine output deterioration, and discharge of harmful exhaust gas are caused.

Misfire diagnosis is thus critical for on-board diagnostics (OBD). An OBD system monitors systems associated with exhaust gas and evaporation gas in the operating areas.

In general, the misfire diagnosis is achieved by measuring variation of an angular velocity of a crankshaft. When a road on which a vehicle travels has a rough surface, the angular velocity of the crankshaft varies due to vibration transferred from a wheel of the vehicle. When the misfire diagnosis is performed only by the variation in angular velocity of the crankshaft, it may be misdiagnosed that the misfire occurs even though the misfire does not occur.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system and a method for misfire diagnosis, capable of improving reliability by preventing misfire misdiagnosis.

According to an exemplary embodiment of the present inventive concept, a system for the misfire diagnosis includes a rotational angular velocity sensor acquiring an angular velocity of an engine. An acceleration sensor acquires an acceleration according to vertical vibration of a vehicle. A diagnosis unit is configured to compare the acceleration with an acceleration threshold to determine whether the vehicle is driven on a rough road and to diagnose whether misfire occurs in the engine based on whether the vehicle is driven on the rough road and a variation of the angular velocity. A threshold setting unit is configured to acquire misfire diagnosis results from the diagnosis unit in a first test environment in which the vehicle is driven on the rough road without forcible misfire and in a second test environment in which the vehicle is driven on the rough road while the forcible misfire occurs in at least one cylinder of the engine. The threshold setting unit is further configured to calculate a misfire misdiagnosis rate according to the misfire diagnosis results in the first and second test environments when the forcible misfire occurs and to update the acceleration threshold so that the misfire misdiagnosis rate has a value smaller than a target value.

According to another exemplary embodiment of the present inventive concept, a method for misfire diagnosis in a misfire diagnosis system includes acquiring first driving data including a first angular velocity of an engine and a first acceleration according to vertical vibration of a vehicle in a first test environment in which the vehicle is driven on a rough road without forcible misfire. Second driving data including a second angular velocity and a second acceleration is acquired in a second test environment in which the vehicle is driven on the rough road while the forcible misfire occurs in at least one cylinder of the engine. Each of the first and second acceleration is compared with an acceleration threshold to determine whether the vehicle is driven on the rough road. Whether the misfire of the engine occurs or not is diagnosed based on a variation of the rotational angular velocity when the vehicle is driven on the rough road. A first misfire misdiagnosis rate is calculated according to a misfire diagnosis result of the engine when the forcible misfire occurs in the first and second test environments. The acceleration threshold is updated so that the first misfire misdiagnosis rate has a value smaller than a target value.

According the exemplary embodiments of the present inventive concept, misfire misdiagnosis is prevented when a vehicle is driven on a rough road to prevent unnecessary torque restriction of an engine and improve engine durability.

DETAILED DESCRIPTION OF THE EMBODIMENTS

Figure 1:
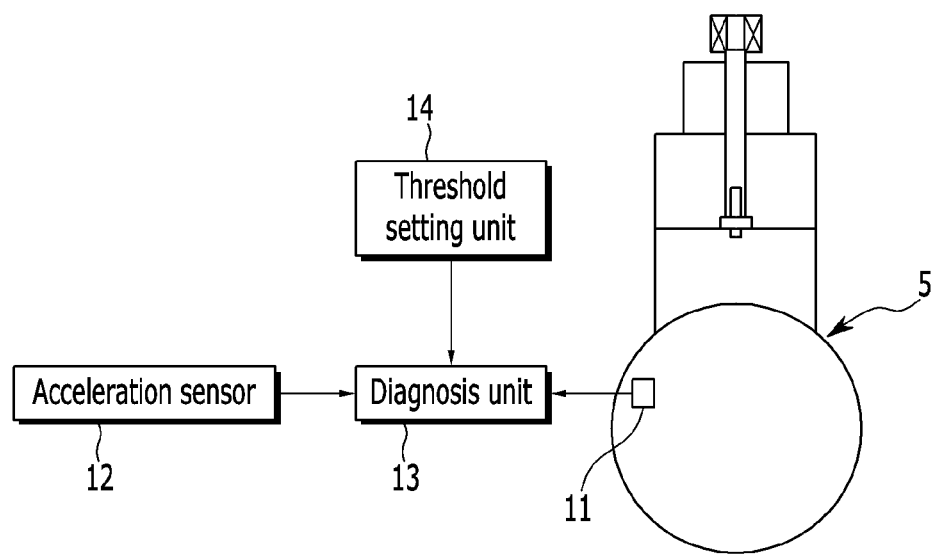
FIG. 1 is a structural diagram schematically illustrating a system for misfire diagnosis according to an exemplary embodiment of the present inventive concept.

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be under- FIG. 1 is a structural diagram schematically illustrating a system for misfire diagnosis according to an exemplary embodiment of the present inventive concept.

Referring to FIG. 1, a system for misfire diagnosis according to an exemplary embodiment of the present inventive concept may include an angular velocity sensor 11, an acceleration sensor 12, a diagnosis unit 13, a threshold setting unit 14, and the like.

For such an object, the threshold setting unit 14 may be implemented with at least one processor operating by a predetermined program, and the predetermined program may be programmed to perform each step according to a method for misfire diagnosis according to an exemplary embodiment of the present invention.

The rotational angular velocity sensor 11 detects an angular velocity of an engine 5 (revolutions per minute (RPM) of an engine 5). The angular velocity sensor 11 may include a crank position sensor (CPS) detecting an angular velocity of a crankshaft. The CPS sensor may include an optical sensor, a magnetic sensor, a hole-type sensor, and the like according to an operation type thereof. The angular velocity detected by the angular velocity sensor 11 is transferred to the diagnosis unit 13 through controller area network (CAN) communication.

The acceleration sensor 12 is installed on a vehicle to detect acceleration according to vertical vibration of the vehicle. The acceleration detected by the acceleration sensor 12 is output to the diagnosis unit 13 through the CAN communication.

The diagnosis unit 13 diagnoses misfire of the engine 5 based on variation of the angular velocity acquired by the rotational angular velocity sensor 11. That is, the diagnosis unit 13 may diagnose that the misfire occurs when the variation of the angular velocity of the engine 5 acquired through the angular velocity sensor 11 has a larger value than a threshold.

The diagnosis unit 13 may diagnose whether the vehicle is driven on a rough road based on the acceleration acquired from the acceleration sensor 12. The diagnosis unit 13 determines that the vehicle is driven on the rough road when the acceleration acquired through the acceleration sensor 12 is equal to or larger than an acceleration threshold. Here, the acceleration threshold for determining whether the vehicle is driven on the rough road may be acquired previously by the threshold setting unit 14 to be described below.

The diagnosis unit 13 may maintain or stop the misfire diagnosis based on whether the vehicle is driven on the rough road. That is, the diagnosis unit 13 stops the misfire diagnosis when the vehicle is driven on the rough road. When the vehicle is not driven on the rough road, the diagnosis unit 13 performs the misfire diagnosis using the angular velocity of the engine 5.

The diagnosis unit 13 may be provided as a constituent element of an electronic control unit (ECU) of the vehicle.

The threshold setting unit 14 sets an acceleration threshold for determining whether the vehicle is driving on the rough road.

The threshold setting unit 14 acquires a misfire diagnosis result from the diagnosis unit 13 in a first test environment of driving on the rough road without forcible misfire, and a second test environment of driving on the rough road in a state where the forcible misfire occurs in at least one cylinder.

The threshold setting unit 14 calculates a misfire misdiagnosis rate of the diagnosis unit 13 by comparing the misfire diagnosis result acquired from the diagnosis unit 13 with whether the forcible misfire occurs in each test environment. In addition, the acceleration threshold is updated until a misfire misdiagnosis rate of the diagnosis unit 13 has a value smaller than a target value. When the misfire misdiagnosis rate has the value smaller than the target value, the acceleration threshold is set as the acceleration threshold for determining whether the vehicle is driven on the rough road.

Here, the diagnosis unit 13 performs the misfire diagnosis using driving data (the angular velocity and acceleration) acquired in each test environment whenever the acceleration threshold is updated, and transfers the misfire diagnosis result to the threshold setting unit 14.

Hereinafter, a method of setting the acceleration threshold of the system for the misfire diagnosis according to the exemplary embodiment of the present inventive concept will be described with reference to FIG. 2.

Figure 2:
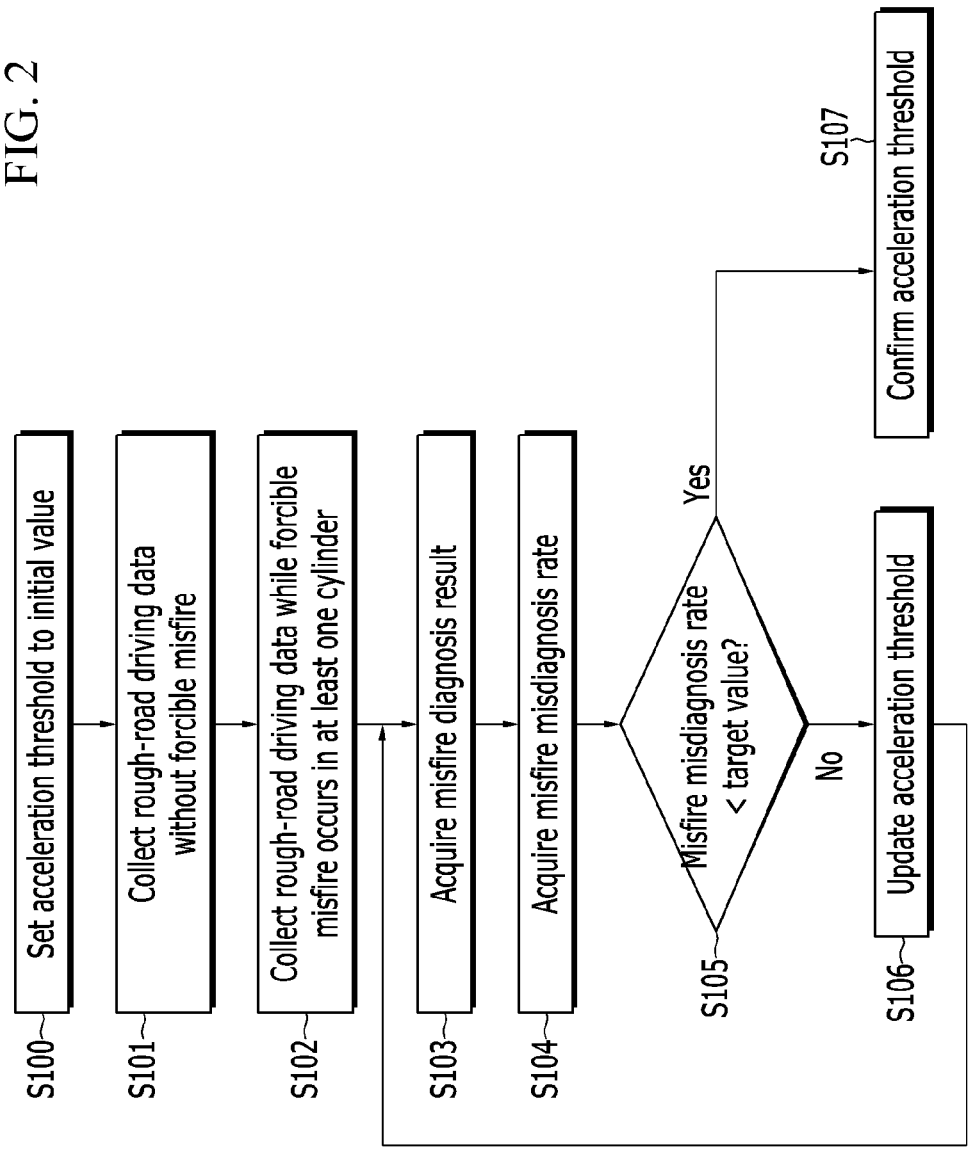
FIG. 2 is a flowchart schematically illustrating a method of setting the acceleration threshold of the system for misfire diagnosis according to the exemplary embodiment of the present inventive concept.

FIG. 2 is a flowchart schematically illustrating a method of setting an acceleration threshold of the system for misfire diagnosis according to an exemplary embodiment of the present inventive concept.

Referring to FIG. 2, the system for misfire diagnosis according to an exemplary embodiment of the present inventive concept sets an initial value of an acceleration threshold that is a reference for determining a rough road (S100). Here, the initial value of the acceleration threshold may be acquired from a statistic of the acceleration threshold which is applied to a vehicle model installed with the system for misfire diagnosis according to the present disclosure.

Next, the system for misfire diagnosis according to the present disclosure collects driving data (angular velocity and acceleration) of a vehicle from the angular velocity sensor 11 and the acceleration sensor 12 in a first test environment where the vehicle is driven on the rough road without forcible misfire of the engine 5 (S101).

Further, the system collects driving data (angular velocity and acceleration) of the vehicle through the angular velocity sensor 11 and the acceleration sensor 12, in a second test environment where the vehicle is driven on the rough road in a state where the forcible misfire occurs in at least one cylinder of the engine 5 (S102).

In step S102, the system may collect the driving data in various forcible misfire test environments, such as where the vehicle is driven on the rough road in a state where one cylinder is continuously and forcibly misfired in the engine 5 and where the vehicle is driven on the rough road in a state where the cylinder of the engine 5 is randomly and partially forcibly misfired.

Next, the system for misfire diagnosis according to the present disclosure performs the misfire diagnosis using the first and second driving data acquired through step S101 and step S102 from the diagnosis unit 13 and acquires a misfire diagnosis result (S103). In step S103, the method for misfire diagnosis according to the present disclosure may be performed by the same method as a method for misfire diagnosis of FIG. 3 to be described below.

The system for misfire diagnosis according to the present disclosure acquires a misfire misdiagnosis rate by checking whether an actual misfire occurs in each test environment and comparing the misfire diagnosis result with an actual misfire result in each test environment, when the misfire diagnosis for the driving data acquired in each test environment is completed (S104).

In step S104, in the system for misfire diagnosis, the forcible misfire occurs in the second test environment when the driving data are acquired, but when the diagnosis unit 13 diagnoses that the misfire is not generated, the diagnosis unit 13 determines that the misfire misdiagnosis occurs. Further, in the second test environment when the driving data are acquired, the forcible misfire is not generated, but when the diagnosis unit 13 diagnoses that the misfire occurs, the diagnosis unit 13 determines that the misfire misdiagnosis occurs. The threshold setting unit 14 calculates the number of misfire misdiagnoses of the diagnosis unit 13, and calculates a misfire misdiagnosis rate based on a ratio of the number of misfire misdiagnoses to the entire number of misfire diagnoses of the diagnosis unit 13.

The system for the misfire diagnosis calculates the misfire misdiagnosis rate to compare the misfire misdiagnosis rate with a target value (S105). Here, the target value represents a targeted misfire misdiagnosis rate and may be preset when the vehicle is released.

The system for misfire diagnosis according to the present disclosure updates the acceleration threshold when the misfire misdiagnosis rate is equal to or larger than the target value (S106), and re-performs steps S103 to S105 based on the updated acceleration threshold.

When the misfire misdiagnosis rate is smaller than the target value, the system for the misfire diagnosis confirms a current acceleration threshold as a last acceleration threshold (S107).

As described above, when the acceleration threshold is set, the system for the misfire diagnosis diagnoses whether the vehicle is driven on the rough road by using the set acceleration threshold and diagnoses the misfire of the engine according to whether the vehicle is driven on the rough road.

Hereinafter, a method for misfire diagnosis of the system for misfire diagnosis according to an exemplary embodiment of the present inventive concept will be described with reference to FIG. 3.

Figure 3:
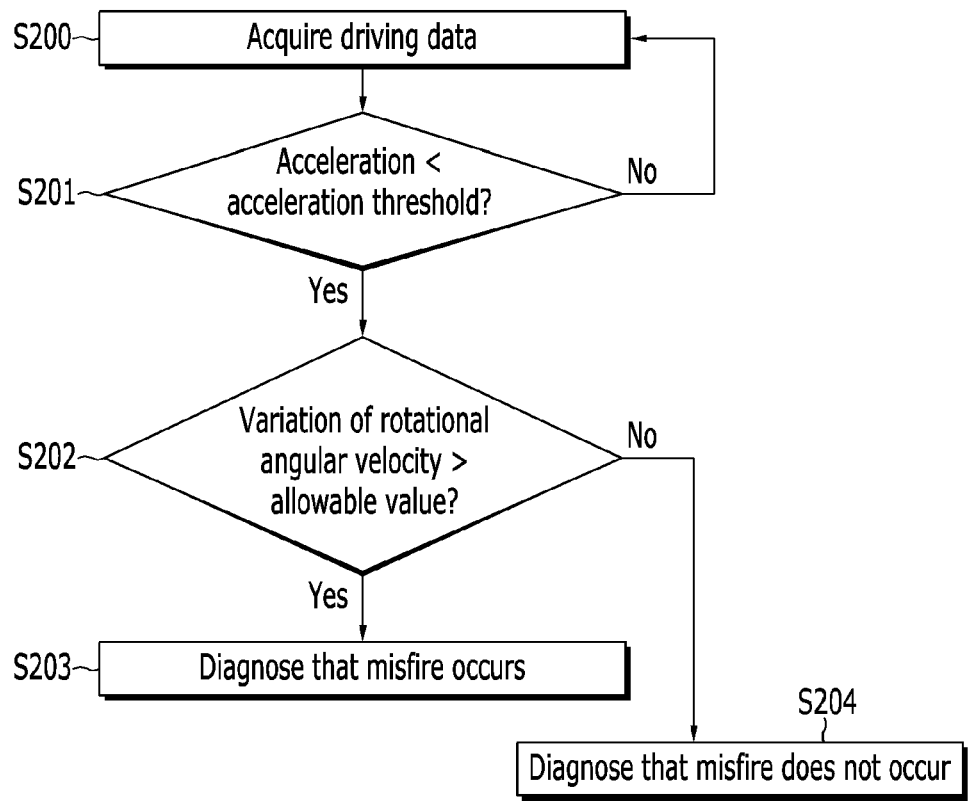
FIG. 3 is a flowchart schematically illustrating a method for misfire diagnosis of the system for misfire diagnosis according to the exemplary embodiment of the present inventive concept.

FIG. 3 is a flowchart schematically illustrating a method for misfire diagnosis of the system for misfire diagnosis according to an exemplary embodiment of the present inventive concept.

Referring to FIG. 3, the system for misfire diagnosis according to the present disclosure acquires driving data of a vehicle from the angular velocity sensor 11 and the acceleration sensor 12 in a state where the vehicle is driving (S200). Here, the driving data include an angular velocity of the engine 5 and an acceleration according to vertical vibration of the vehicle.

Next, the system for misfire diagnosis according to the present disclosure compares the acceleration acquired from the acceleration sensor 12 with an acceleration threshold through the diagnosis unit 13 (S201), and determines whether the vehicle is driven on a rough road according to the compared result.

In step S201, the acceleration threshold may be set by the method of setting the acceleration threshold described above with reference to FIG. 2.

In step S201, the system for misfire diagnosis according to the present disclosure determines that the vehicle is driving on the rough road when the acceleration acquired from the acceleration sensor 12 is equal to or larger than the acceleration threshold. Accordingly, the system for the misfire diagnosis prevents the misfire misdiagnosis due to driving on the rough road by omitting the misfire diagnosis.

In step S201, the system for misfire diagnosis according to the present disclosure determines that the vehicle is not driving on the rough road when the acceleration acquired from the acceleration sensor 12 is smaller than the acceleration threshold. Accordingly, the system for misfire diagnosis according to the present disclosure performs the misfire diagnosis using the angular velocity of the engine 5 through the diagnosis unit 13. That is, the system for misfire diagnosis according to the present disclosure compares variation of the angular velocity of the engine 5 through the diagnosis unit 13 with an allowable value (S202), and determines whether the misfire occurs according to the compared result.

In step S202, the diagnosis unit 13 diagnoses that the misfire occurs when the variation of the angular velocity of the engine 5 is equal to or larger than the allowable value (S203).

When the variation of the angular velocity of the engine 5 is smaller than the allowable value, the diagnosis unit 13 diagnoses that the misfire is not generated (S204).

As described above, the system for misfire diagnosis according to the exemplary embodiment of the present inventive concept determines whether a vehicle travels on a rough road based on the acceleration according to vertical vibration of the vehicle and stops the misfire diagnosis of the vehicle when the vehicle is driving on the rough road. Further, instead of uniformly applying the acceleration threshold for determining whether the vehicle travels on the rough road, the misfire misdiagnosis rate may be reduced by setting an acceleration threshold to each vehicle. Thus, an unnecessary torque limit of the engine due to the misfire misdiagnosis may be prevented, and durability of the engine may be improved. Further, unlike an existing method of determining the misfire misdiagnosis through communication with an anti-lock brake system (ABS), the misfire misdiagnosis may be minimized by only the test process of setting the acceleration threshold for each vehicle to prevent the misfire misdiagnosis even in the vehicle without an anti-lock braking system (ABS).

The method for misfire diagnosis according to the exemplary embodiment of the present inventive concept may be performed with software. When the method for the misfire diagnosis is performed with software, constituent means of the present disclosure are code segments which execute necessary operations. Programs or code segments may be stored in a processor recordable medium or transmitted by a computer data signal which is coupled with a carrier in a transmission medium or a communication network.

A computer-readable recording medium includes every type of recording devices in which data readable by a computer system processor is stored. Examples of the computer-recordable recording medium include a ROM, a RAM, a CD-ROM, a DVD-ROM, a DVD-RAM, a magnetic tape, a floppy disk, a hard disk, an optical data storage device, and the like. Further, the computer-readable recording medium is distributed in computer systems connected through a network, and a computer-readable code may be stored therein and executed in a distributed manner.

The drawings referred to and the detailed description of the present disclosure disclosed up to now are just exemplary in the present disclosure, and they are used for describing the present disclosure but are not used to limit a meaning or limit the scope of the present disclosure disclosed in the claims. Therefore, those skilled in the art can easily select and substitute the drawings and the detailed description therefrom. Further, those skilled in the art can omit some of components described in the specification without deterioration of performance and add components in order to improve performance. Moreover, those skilled in the art can change the order of steps of the method described in the specification according to a process environment or equipment. Accordingly, the scope of the present disclosure should be determined not according to the described exemplary embodiment, but according to the appended claims and equivalents thereto.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A system for misfire diagnosis of a vehicle engine, the system comprising:
an angular velocity sensor acquiring an angular velocity of the engine;
an acceleration sensor acquiring an acceleration according to vertical vibration of a vehicle;
a diagnosis unit configured to compare the acceleration with an acceleration threshold to determine whether the vehicle is driven on a rough road and configured to diagnose whether misfire occurs in the engine based on whether the vehicle is driven on the rough road and a variation of the angular velocity; and
a threshold setting unit configured to acquire misfire diagnosis results from the diagnosis unit in a first test environment in which the vehicle is driven on the rough road without forcible misfire and in a second test environment in which the vehicle is driven on the rough road while the forcible misfire occurs in at least one cylinder of the engine, configured to calculate a misfire misdiagnosis rate according to misfire diagnosis results in the first and second test environments when the forcible misfire occurs, and configured to update the acceleration threshold so that the misfire misdiagnosis rate has a value that is smaller than a target value.

2. The system of claim 1, wherein the diagnosis unit determines that the vehicle is driven on the rough road when the acceleration is equal to or larger than the acceleration threshold.

3. The system of claim 2, wherein the diagnosis unit stops the misfire diagnosis when it is determined that the vehicle is driven on the rough road.

4. The system of claim 2, wherein the diagnosis unit diagnoses whether the misfire occurs in the engine by comparing the variation of the angular velocity with an allowable value.

5. The system of claim 4, wherein the diagnosis unit diagnoses that the misfire occurs in the engine when the variation of the angular velocity is larger than the allowable value.

6. The system of claim 1, wherein the diagnosis unit includes an electronic control unit (ECU) of the vehicle.

7. A method for misfire diagnosis of a vehicle engine in a misfire diagnosis system, the method comprising:
acquiring, by an angular velocity sensor and an acceleration sensor respectively, first driving data including a first angular velocity of an engine and a first acceleration according to vertical vibration of a vehicle in a first test environment in which the vehicle is driven on a rough road without forcible misfire;
acquiring, by the angular velocity sensor and the acceleration sensor respectively, second driving data including a second angular velocity and a second acceleration in a second test environment in which the vehicle is driven on the rough road while the forcible misfire occurs in at least one cylinder of the engine;
comparing each of the first and second accelerations with an acceleration threshold to determine whether the vehicle is driven on the rough road;
diagnosing whether the misfire of the engine occurs based on a variation of each of the first and second angular velocities and when it is determined that the vehicle is driven on the rough road;
calculating a first misfire misdiagnosis rate according to a misfire diagnosis result of the engine in the first and second test environments when the forcible misfire occurs in the first and second test environments; and
updating the acceleration threshold so that the first misfire misdiagnosis rate has a value smaller than a target value.

8. The method of claim 7, wherein in the step of determining, it is determined that the vehicle is driven on the rough road when the each of the first and second accelerations is equal to or larger than the acceleration threshold.

9. The method of claim 8, wherein the diagnosing includes stopping the misfire diagnosis when it is determined that the vehicle is driven on the rough road.

10. The method of claim 8, wherein the diagnosing includes diagnosing whether the misfire occurs in the engine by comparing the variation of each of the first and second angular velocities with an allowable value.

11. The method of claim 7, wherein the diagnosing includes diagnosing that the misfire occurs in the engine when the variation of each of the first and second angular velocities is larger than the allowable value.

12. The method of claim 7, wherein the step of updating includes:
updating the acceleration threshold when the first misfire misdiagnosis rate has a value equal to or larger than the target value;
determining whether the vehicle is driven on the rough road based on the updated acceleration threshold;
re-diagnosing whether the misfire occurs in the engine based on the variation of the angular velocity when it is determined that the vehicle is driven on the rough road;
calculating a second misfire misdiagnosis rate according to the misfire diagnosis result acquired through the step of re-diagnosing when the forcible misfire occurs in the first and second test environments; and
updating the acceleration threshold so that the second misfire misdiagnosis rate has a value smaller than the target value.

13. The method of claim 7, wherein the step of updating includes:
confirming the acceleration threshold as a final acceleration threshold when the first misfire misdiagnosis rate is smaller than the target value.

14. A non-transitory computer-readable recording medium comprising computer executable instructions execution of which causes a controller to perform the method of claim 7.

* * * * *